(12) United States Patent
Cichielo et al.

(10) Patent No.: US 7,574,047 B2
(45) Date of Patent: *Aug. 11, 2009

(54) METHOD AND SYSTEM FOR PERFORMING IMAGE MARK RECOGNITION

(75) Inventors: Robert Cichielo, Asbury, NJ (US); Jeffrey Hoffman, Lebanon, NJ (US)

(73) Assignee: Educational Testing Service, Princeton, NJ (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/869,527

(22) Filed: Oct. 9, 2007

(65) Prior Publication Data

US 2008/0253658 A1     Oct. 16, 2008

Related U.S. Application Data

(63) Continuation of application No. 10/760,850, filed on Jan. 20, 2004, now Pat. No. 7,298,902.

(51) Int. Cl.
*G06K 9/18* (2006.01)
(52) U.S. Cl. .................. 382/184; 382/165; 382/175; 382/318; 434/354; 434/359
(58) Field of Classification Search .......... 382/165, 382/175, 184, 318; 235/494; 434/322, 353, 434/359
See application file for complete search history.

(56) References Cited

U.S. PATENT DOCUMENTS

| | | | |
|---|---|---|---|
| 3,601,906 A | 8/1971 | Roche | |
| 3,870,865 A | 3/1975 | Schneiderhan et al. | |
| 4,153,895 A | 5/1979 | Weisbrod et al. | |
| 4,217,487 A | 8/1980 | Kjeer | |
| 4,300,123 A | 11/1981 | McMillin et al. | |
| 4,817,179 A | 3/1989 | Buck | |
| 4,979,136 A | 12/1990 | Weiman et al. | |
| 5,038,393 A | 8/1991 | Nanba | |
| 5,101,448 A | 3/1992 | Kawachiya et al. | |
| 5,102,341 A | 4/1992 | Koslin | |
| 5,103,490 A | 4/1992 | McMillin | |

(Continued)

FOREIGN PATENT DOCUMENTS

JP     62263584     11/1987

(Continued)

OTHER PUBLICATIONS

International Search Report of PCT/US05/01216, May 16, 2007.

(Continued)

*Primary Examiner*—Gregory M Desire
(74) *Attorney, Agent, or Firm*—Jones Day; Joseph Melnik

(57) ABSTRACT

A method and system for performing image mark recognition for a document is disclosed. A document is scanned into a digital image. Reference image marks are sensed from the digital image. The reference image marks may include trigger row marks and/or corner/crop marks. Coordinates denoting the location of cells within the digital image are determined base on the locations of the reference image marks. Response marks are evaluated for darkness, opacity, and/or grayness on a pixel-by-pixel basis. The response marks are each assigned a percentage value based on the ratio between a total color value for a cell and a maximum color value for a cell.

14 Claims, 4 Drawing Sheets

U.S. PATENT DOCUMENTS

| | | | |
|---|---|---|---|
| 5,129,014 A | 7/1992 | Bloomberg | |
| 5,134,669 A | 7/1992 | Keogh et al. | |
| 5,253,304 A | 10/1993 | LeCun et al. | |
| 5,452,379 A | 9/1995 | Poor | |
| 5,568,571 A | 10/1996 | Willis et al. | |
| 5,572,601 A | 11/1996 | Bloomberg | |
| 5,600,732 A | 2/1997 | Ott et al. | |
| 5,625,770 A | 4/1997 | Nomura | |
| 5,649,026 A | 7/1997 | Heins | |
| 5,672,060 A | 9/1997 | Poor | |
| 5,675,671 A | 10/1997 | Hayduchok et al. | |
| 5,754,674 A | 5/1998 | Ott et al. | |
| 5,818,976 A | 10/1998 | Pasco et al. | |
| 5,825,947 A | 10/1998 | Sasaki et al. | |
| 5,870,488 A | 2/1999 | Rush et al. | |
| 5,956,422 A | 9/1999 | Alam | |
| 6,079,624 A | 6/2000 | Apperson et al. | |
| 6,129,278 A | 10/2000 | Wang et al. | |
| 6,173,154 B1 | 1/2001 | Kucinski et al. | |
| 6,188,787 B1 | 2/2001 | Ohmae et al. | |
| 6,213,664 B1 | 4/2001 | Kondo | |
| 6,259,814 B1 | 7/2001 | Krtolica et al. | |
| 6,299,066 B1 | 10/2001 | Howland et al. | |
| 6,311,040 B1 | 10/2001 | Kucinski et al. | |
| 6,325,286 B1 | 12/2001 | Howland et al. | |
| 6,408,106 B1 | 6/2002 | Tatsuta et al. | |
| 6,542,629 B1 | 4/2003 | Wu | |
| 6,575,367 B1 | 6/2003 | Longacre | |
| 6,580,820 B1 | 6/2003 | Fan | |
| 6,684,052 B2 | 1/2004 | Kucinski et al. | |
| 6,741,738 B2 | 5/2004 | Taylor | |
| 6,927,872 B2 | 8/2005 | Currans | |
| 6,970,267 B1 | 11/2005 | Scanlon | |
| 7,004,393 B2 | 2/2006 | Schum et al. | |
| 7,164,797 B2 * | 1/2007 | Simard et al. | 382/218 |
| 7,236,653 B2 * | 6/2007 | Constantin et al. | 382/306 |
| 7,242,806 B2 * | 7/2007 | Johnson et al. | 382/209 |
| 2001/0033688 A1 | 10/2001 | Taylor | |
| 2002/0168090 A1 | 11/2002 | Bruce et al. | |
| 2002/0181805 A1 | 12/2002 | Loeb et al. | |
| 2003/0072019 A1 | 4/2003 | Haines et al. | |
| 2003/0173404 A1 | 9/2003 | Chung et al. | |
| 2004/0139391 A1 * | 7/2004 | Stumbo et al. | 715/512 |
| 2004/0185424 A1 | 9/2004 | Kucinski et al. | |
| 2004/0202992 A1 | 10/2004 | Moulthrop et al. | |
| 2005/0157930 A1 | 7/2005 | Cichielo et al. | |
| 2005/0201639 A1 | 9/2005 | Wu | |
| 2006/0062453 A1 | 3/2006 | Schacht | |
| 2006/0250660 A1 | 11/2006 | Cui | |
| 2006/0252023 A1 | 11/2006 | Cui | |
| 2006/0255145 A1 * | 11/2006 | Chung et al. | 235/454 |
| 2007/0116358 A1 * | 5/2007 | Klotz et al. | 382/175 |
| 2007/0192176 A1 * | 8/2007 | Onischuk | 705/12 |

FOREIGN PATENT DOCUMENTS

JP    6176192    6/1994

OTHER PUBLICATIONS

Written Opinion of the International Searching Authority of PCT/US05/01216, May 16, 2007.

International Preliminary Report on Patentability of PCT/US05/01216, Jun. 19, 2007.

* cited by examiner

*tc* = total color
*pc* = potential color
*v* = cell value
*c* = pixel color (0 = white ... 15 = black) for 16 level gray

*c* = 4, (*c* x 8) = 32
*c* = 9, (*c* x 12) = 108
*c* = 15, (*c* x 12) = 180

*tc* = 320 = (32 + 108 + 180)
*pc* = 540 (6 x 6 grid x *black*)
*v* = ~59% (*tc* / *pc*)

*c* = 2, (*c* x 8) = 16
*c* = 5, (*c* x 12) = 60
*c* = 8, (*c* x 12) = 96

*tc* = 172 = (16 + 60 + 96)
*pc* = 540 (6 x 6 grid x *black*)
*v* = ~32% (*tc* /*pc*)

METHOD AND SYSTEM FOR PERFORMING IMAGE MARK RECOGNITION

CROSS-REFERENCE TO RELATED APPLICATION

This is a continuation application of U.S. Non-Provisional Patent Application No. 10/760,850, filed Jan. 20, 2004, titled "Method and System for Image Mark Recognition," which was pending at the time the present application was filed and was issued as U.S. Pat. No. 7,298,902B2 on Nov. 20, 2007 and is hereby incorporated by reference.

FIELD OF THE INVENTION

The present invention generally relates to the field of mark recognition. The present invention particularly relates to scanning an image of a document and performing mark recognition on the scanned image. In an embodiment, a response mark may be indicative of an intended response to a question and/or may be representative of coded information. In a preferred embodiment, the present invention provides a hardware independent methodology for evaluating the presence or absence of one or more marks on a document, which may be configured to higher or lower resolutions as needed.

BACKGROUND OF THE INVENTION

Conventional mark reading systems have been employed to extract information, such as pencil marks, from a document. These systems typically include a scanner configured to read marks from the document. The scanner creates a digitized representation of the document. The digitized document is then processed by a separate application to evaluate the document. In an assessment environment, this system can be used to score examination responses. For example, many students and other examinees are familiar with the typical response format for answering multiple choice questions which requires the student to fill-in a space (e.g. a circle, square, etc.) associated with the question. Mark reading systems can grade such answer sheets significantly faster and more accurately than a human grader. However, conventional mark reading systems are limited by the accuracy with which the document is digitized. Increased accuracy is available with more sophisticated and more expensive systems. When a high degree of accuracy is required, expensive scanning equipment can be purchased which will provide a digitized representation of the document within most accepted error rates. However, in addition to the expense associated with such systems, they may not be easily configured to alternate environments where differing accuracy levels are required. When accuracy in the digitizing process is sacrificed, such systems often improperly grade test answers. For example, the systems may not recognize properly marked target areas that are incompletely filled or in which the pencil marking is lighter than a threshold value. Moreover, the systems may recognize stray marks and erasures as incorrect answers when a test taker did not intend such an answer.

A particularly egregious error may result when a test taker properly marks a correct answer for a question, but a mark reading system recognizes a stray mark or erasure as an incorrect answer for the same question. In this case, although the test taker correctly answered the question, the test taker would not receive credit because the system would report that the test taker provided two answers. As such, the test taker may be penalized because of the medium in which the test is presented rather than the substantive material on which the test is based.

What is needed is an improved image mark recognition system that can accurately evaluate the marks on a document to be digitized which is both cost effective and independent of the hardware being used to scan the document.

SUMMARY OF PREFERRED EMBODIMENTS

Before the present methods, systems, and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "mark" is a reference to one or more marks and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

The present invention relates to enhancing a scanned image of a document or more accurately performing mark recognition of the scanned image to determine the presence or absence of a mark. The methodology of the present invention begins after a document has been digitized. The digitized image is then mapped to a coordinate system. The mapping is performed on the digitized image by using trigger rows, which are determined using existing marks on one margin of the document. The trigger rows are then logically extended across the document. Next, the present invention completes the mapping process by logically creating columns orthogonal to the extended trigger rows. The number of columns created can vary and may be configured to the degree of accuracy required. Alternately, the mapping process may be performed by using corner marks (also known as anchor marks or crop marks), which are marks printed at each corner of the document. A coordinate system is then created by determining the number of rows desired, which may vary, and equally dividing the space into horizontal rows, and by determining the number of columns desired, which may vary, and equally dividing the space into vertical columns. Document deskew may also be performed. Those skilled in the art will understand that other methods for mapping the digitized image to a coordinate system may also be used.

Next, a resolver engine evaluates each cell on a pixel-by-pixel basis. The pixel-by-pixel analysis results in a value for each cell. The value may represent the opacity of a response mark present in the cell. The result is that the digitized image has been converted into a series of numeric values each representing a potential response mark on the original document.

In a preferred embodiment, a method of performing image mark recognition includes accessing a scanned image of a document containing a plurality of image marks, performing reference image mark recognition on the scanned image, performing coordinate mapping on the scanned image to determine coordinates for a plurality of cells within the scanned image, analyzing one or more pixels in each cell, and determining a cell color value for each cell based on values assigned to the one or more pixels. In an embodiment, performing reference image mark recognition includes determining a location for each of one or more alignment marks and may further include verifying image mark alignment and spacing based on a resolution of the scanned image and the locations of the one or more alignment marks. In an embodiment, determining the location of one or more alignment marks includes examining each corner of the scanned image. In an embodiment, determining the location of one or more alignment marks includes searching for trigger rows on at least one margin of the scanned image.

In an embodiment, performing coordinate mapping includes computing logical row coordinates for a number of rows in the scanned image, computing logical column coordinates for a number of columns in the scanned image, creating a mapping within the scanned image, and resolving the mapping into coordinate values for each of a plurality of cells. In an embodiment, computing logical row coordinates and logical column coordinates includes using one or more trigger marks as reference points. In an embodiment, computing logical row coordinates and logical column coordinates includes using one or more corner marks as reference points. The number of rows and the number of columns may be automatically determined based on the step of performing reference image mark recognition. Alternately, the number of rows and the number of columns may be pre-determined. In an embodiment, creating a mapping includes determining absolute pixel positions for each cell within the scanned document as defined by an intersection of a row and a column.

In an embodiment, analyzing one or more pixels includes incrementing a total color value by a color value for each pixel in a cell. Determining a cell color value may include setting the cell color value to the ratio of the total color value to a maximum color value.

In a preferred embodiment, a system for performing image mark recognition includes a processor and one or more computer readable mediums operatively coupled to the processor. At least one of the one or more computer readable mediums contains a scanned image of a document. At least one of the one or more computer readable mediums contains computer program instructions for performing a method of performing image mark recognition.

BRIEF DESCRIPTION OF THE DRAWINGS

The accompanying drawings, which are incorporated in and form a part of the specification, illustrate preferred embodiments of the present invention and, together with the description serve to explain the principles of the invention. The embodiments illustrated in the drawings should not be read to constitute limiting requirements, but instead are intended to assist the reader in understanding the invention.

DETAILED DESCRIPTION OF PREFERRED EMBODIMENTS

The present invention relates to resolving a scanner image of a document to perform mark recognition on the scanned image. The present invention provides a system and method for resolving a digitized image of a document, independent of the hardware used to create the digitized image. The digitized image is enlisted by the present invention and a sequence of values representing the presence or absence of response marks on the document is created. This sequence of values is then available for use by any application which may be created to enhance the document, such as a scoring application which may be used to return a score for an examination.

An aspect of the present invention involves mapping the digitized image of a document to a coordinate system. This coordinate mapping may be performed by detecting trigger row marks and/or corner/crop marks to create a logical document mapping. A trigger row mark is a mark on an edge of a document that denotes boundaries of a row logically extending across the document. In an assessment environment, responses may be entered within the logical rows. Each row for which a test taker can potentially enter one or more responses may have a separate trigger row mark. Alternatively, a trigger row mark may be used to denote every second row, third row, or any other pattern that may be used to logically subdivide a document. An alternate method of coordinate mapping includes use of corner/crop marks placed in each corner of the document. The crop marks are located and used to define the coordinate system by sub-dividing the space between the crop marks into a logical coordinate system. For example, adjacent crop marks along the vertical margin of the document may be subdivided into a predetermined number of equally sized rows. Similarly, adjacent crop marks along the horizontal margin of the document may be subdivided into a predetermined number of equally sized columns intersecting with the rows. The pre-determined number of rows and columns may be verified by analyzing the location of the response marks. Alternatively, a user may enter information regarding the document, such as a document number, from which the row and column placement is determined.

Figure 1:
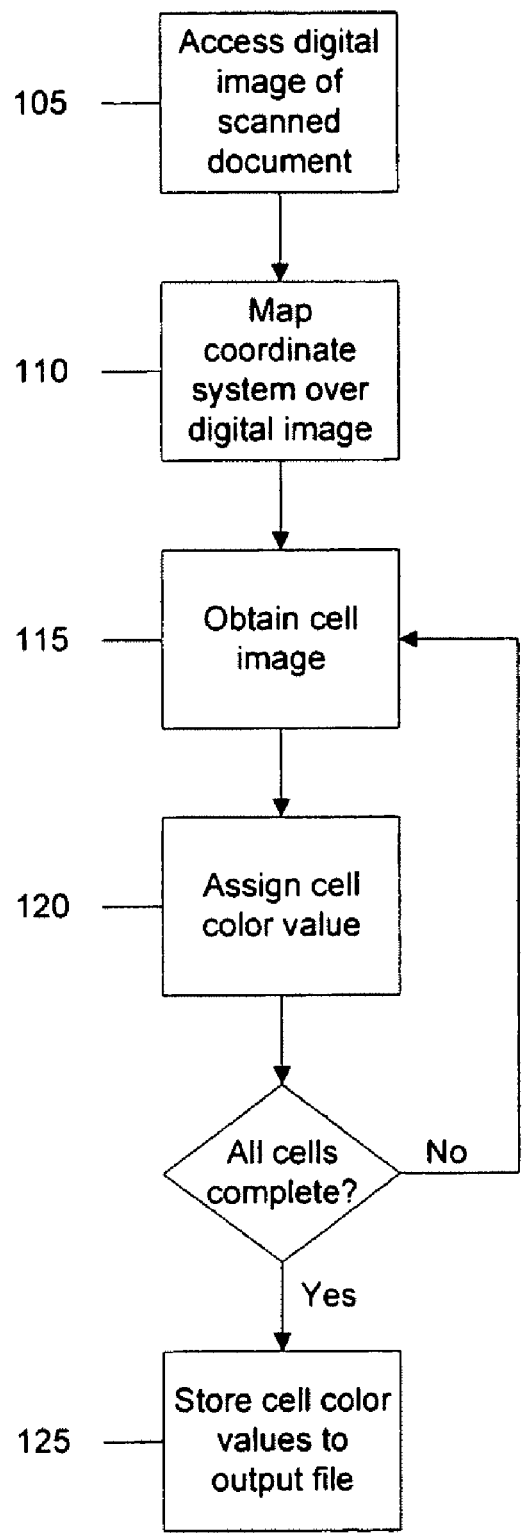
FIG. 1 depicts an exemplary process flow for the image mark recognition process according to an embodiment of the present invention.
Figure 2:
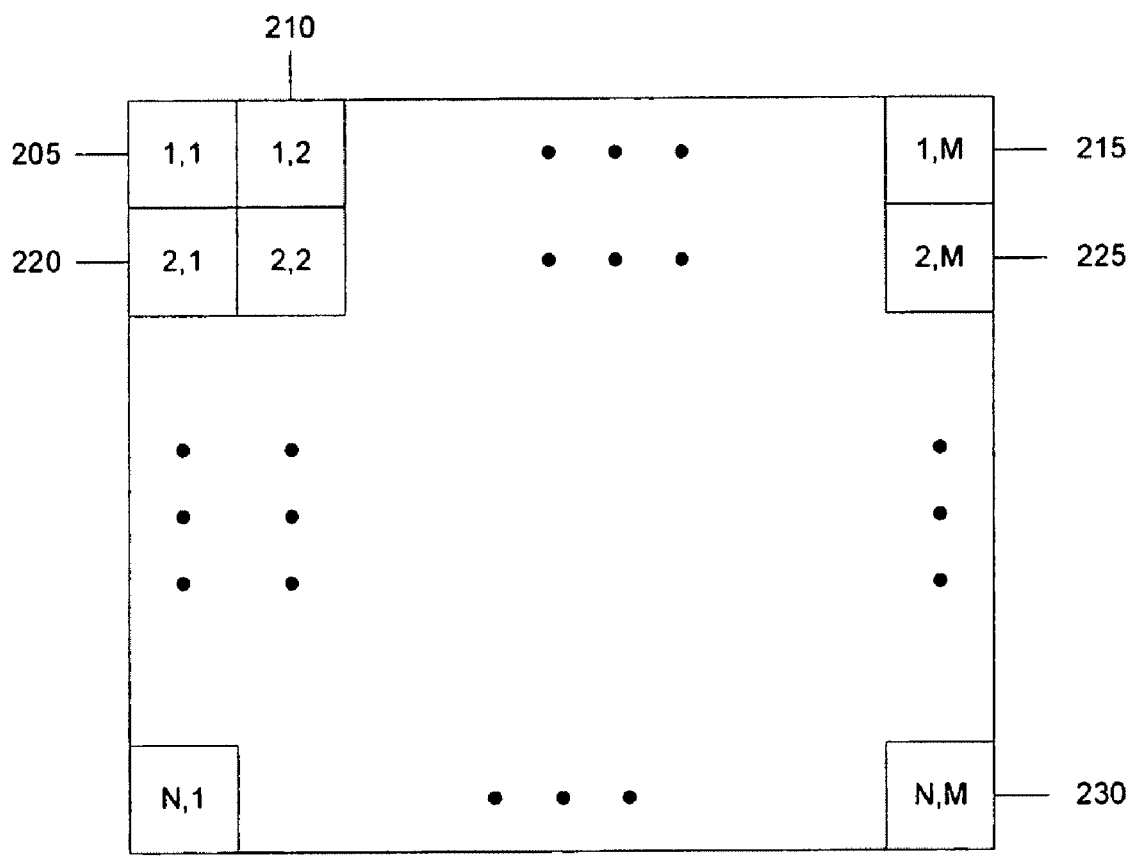
FIG. 2 depicts an exemplary cell evaluation ordering according to an embodiment of the present invention.

As shown in FIG. 1, the process begins by accessing the digital image of a previously scanned document 105. The digital image may have been created by any means available and is not dependent on any particular hardware, format or resolution. A logical coordinate system is then mapped over the digital image 110 using the trigger row technique, the corner/crop mark techniques, or any other technique. The result of the coordinate mapping process 110 is that the digital image of the document has been logically subdivided into a plurality of cells that, in combination, comprise the entire digital image. The number of cells is configurable during the mapping process, and more or fewer cells may preferably be generated depending on the type of document being scanned and the processing required. The process then begins to iteratively analyze the image on a cell-by-cell basis to generate machine-readable data representative of the response marks on the document. This iterative process begins by obtaining the image 115 in the first cell. For example, as shown in FIG. 2, the mapping process may create an (N×M) coordinate system requiring evaluation of N*M cells. This process may, for example, begin by evaluating cell (1,1) 205, proceed to cell (1,2) 210 and continue in the same manner to cell (1,M) 215. Next, cell (2,1) 220 through (2,M) 225 and so on to cell (N,M) 230 may be evaluated. Alternate cell evaluation orderings and numberings are considered to be within the scope of this invention.

Returning to FIG. 1, the process may resolve the response marks in each cell into computer readable values. For each cell, a cell color value from, for example, 0 to 100, inclusive, representing the amount of darkness/lightness of a cell's coloration may be assigned 120. The cell color value may be assigned 120 based on a ratio of the sum of color values for each pixel in a cell having a non-white color (collectively, a total color value) to a maximum color value for the cell. The maximum color value may be equal to the number of pixels in a cell multiplied by a maximum pixel color value.

Figure 3A:
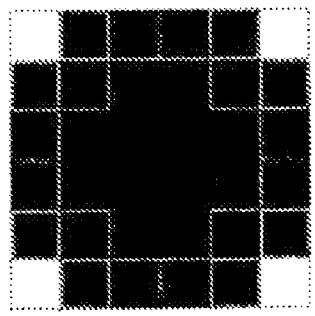
FIGS. 3A and 3B depict exemplary computations of cell color values according to an embodiment of the present invention.
Figure 3A:
Figure 3B:
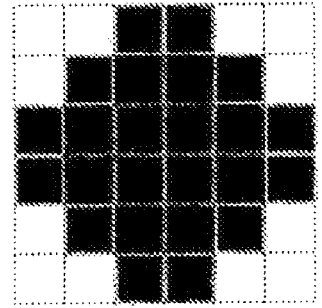
Figure 3B:

Two exemplary computations of a cell color value are shown in FIGS. 3A and 3B. In the exemplary computations, each pixel within a cell may be assigned a pixel color value ranging from 0 to 15, inclusive. In FIG. 3A, the cell has 4 pixels having a pixel color value equal to 0, 8 pixels having a pixel color value equal to 4, 12 pixels having a pixel color value equal to 9, and 12 pixels having a pixel color value equal to 15. The total color value for the cell in FIG. 3A is tc=(4*0)+(8*4)+(12*9)+(12*15)=32+108+180=320. The maximum color value for the cell in FIG. 3A is pc=(6 rows*6 columns*15)=540. The cell color value for the cell in FIG. 3A is v=tc/pc≈59%. Thus, the cell color value for the cell in FIG. 3A is 59.

Similar computations are used to compute the total color value, maximum color value and cell color value in FIG. 3B. Here, tc=172, pc=540, and v≈32%. Hence, the cell color value for the cell in FIG. 3B is 32.

Preferably, a value of 0 may represent the lightest possible mark (e.g., white), and a value of 100 may represent the darkest possible mark (e.g., black). The machine-readable data values for each cell may optionally be stored 125 to an output file.

Figure 4:
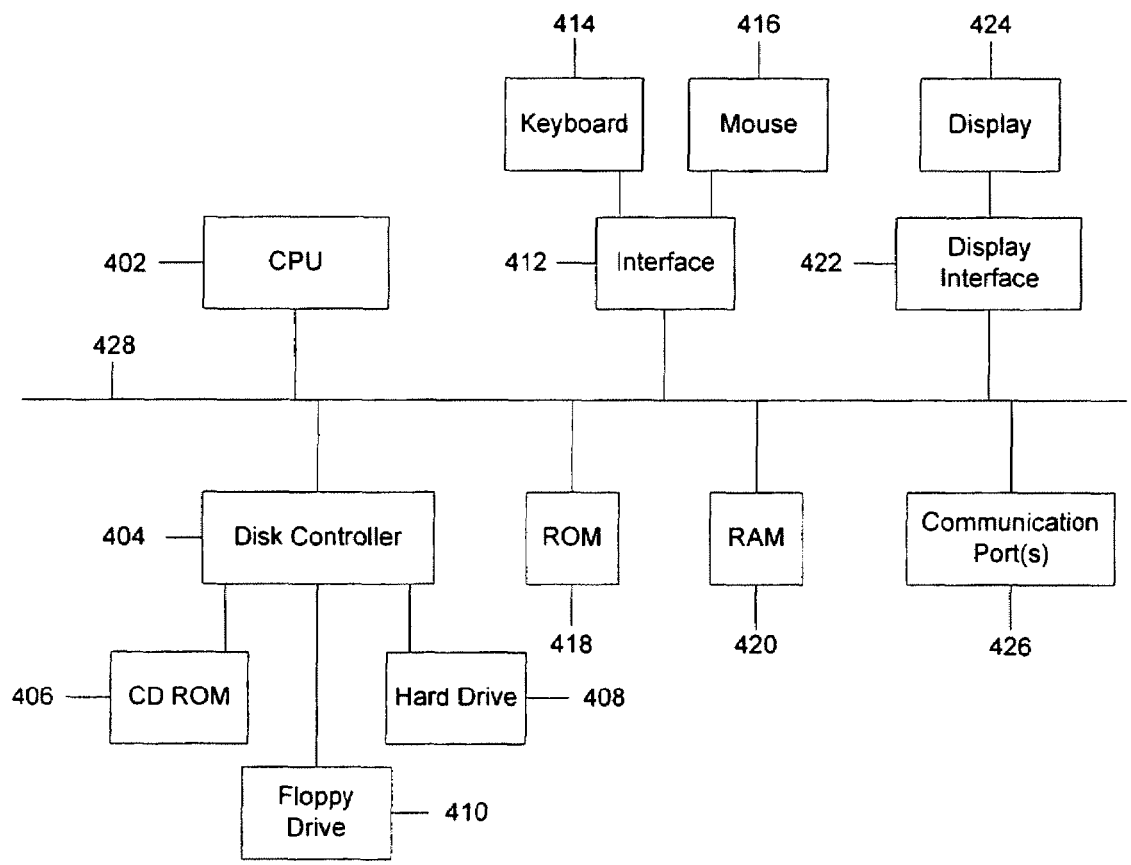
FIG. 4 is a block diagram of exemplary internal hardware that may be used to contain or implement the program instructions of a system embodiment of the present invention.

FIG. 4 is a block diagram of exemplary internal hardware that may be used to contain or implement the program instructions of a system embodiment of the present invention. Referring to FIG. 4, a bus 428 serves as the main information highway interconnecting the other illustrated components of the hardware. CPU 402 is the central processing unit of the system, performing calculations and logic operations required to execute a program. Read only memory (ROM) 418 and random access memory (RAM) 420 constitute exemplary memory devices.

A disk controller 404 interfaces with one or more optional disk drives to the system bus 428. These disk drives may be external or internal floppy disk drives such as 410, CD ROM drives 406, or external or internal hard drives 408. As indicated previously, these various disk drives and disk controllers are optional devices.

Program instructions may be stored in the ROM 418 and/or the RAM 420. Optionally, program instructions may be stored on a computer readable medium such as a floppy disk or a digital disk or other recording medium, a communications signal or a carrier wave.

An optional display interface 422 may permit information from the bus 428 to be displayed on the display 424 in audio, graphic or alphanumeric format. Communication with external devices may optionally occur using various communication ports 426. An exemplary communication port 426 may be attached to a scanner 430 used to scan an image of a document into one or of the memory devices or disk drives.

In addition to the standard computer-type components, the hardware may also include an interface 412 which allows for receipt of data from input devices such as a keyboard 414 or other input device 416 such as a remote control, pointer and/or joystick.

An embedded system may optionally be used to perform one, some or all of the operations of the present invention. Likewise, a multiprocessor system may optionally be used to perform one, some or all of the operations of the present invention.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

The invention claimed is:

1. A computer-implemented method of performing image mark recognition, comprising:
    using a computer, accessing a scanned image of a document containing a plurality of image marks;
    performing reference image mark recognition on the scanned image with the computer;
    using the computer, performing coordinate mapping on the scanned image to determine coordinates for a plurality of cells within the scanned image, wherein each cell comprises a plurality of pixels;
    analyzing one or more pixels in each cell with the computer; and
    determining a cell color value for each cell with the computer based on values assigned to the one or more pixels.

2. The method of claim 1 wherein performing reference image mark recognition comprises determining a location for each of one or more alignment marks.

3. The method of claim 2, further comprising verifying image mark alignment and spacing based on a resolution of the scanned image and the locations of the one or more alignment marks.

4. The method of claim 2 wherein determining the location of one or more alignment marks comprises examining each corner of the scanned image.

5. The method of claim 2 wherein determining the location of one or more alignment marks comprises searching for trigger rows on at least one margin of the scanned image.

6. The method of claim 1 wherein analyzing one or more pixels comprises incrementing a total color value for the cell by a color value for each pixel.

7. The method of claim 6 wherein determining a cell color value comprises setting the cell color value to the ratio of the total color value to a maximum color value.

8. A system for performing image mark recognition, comprising:
    a processor; and
    one or more computer readable mediums operatively coupled to the processor, wherein at least one of the one or more computer readable mediums contains a scanned image of a document,
    wherein at least one of the one or more computer readable mediums contains computer program instructions for performing a method of performing image mark recognition, the method comprising:
        accessing a scanned image of a document containing a plurality of image marks,
        performing reference image mark recognition on the scanned image, performing coordinate mapping on the scanned image to determine coordinates for a plurality of cells within the scanned image, wherein each cell comprises a plurality of pixels, analyzing one or more pixels in each cell, and determining a cell color value for each cell based on values assigned to the one or more pixels.

9. The system of claim 8 wherein the computer program instructions for the step of performing reference image mark recognition comprise determining a location for each of one or more alignment marks.

10. The system of claim 9 wherein the computer program instructions for the step of performing reference image mark recognition further comprise verifying image mark alignment and spacing based on a resolution of the scanned image and the locations of the one or more alignment marks.

11. The system of claim 9 wherein the computer program instructions for the step of determining the location of one or more alignment marks comprise examining each corner of the scanned image.

12. The system of claim 9 wherein the computer program instructions for the step of determining the location of one or more alignment marks comprise searching for trigger rows on at least one margin of the scanned image.

13. The system of claim 8 wherein the computer program instructions for the step of analyzing one or more pixels comprise incrementing a total color value for the cell by a color value for each pixel.

14. The system of claim 13 wherein the computer program instructions for the step of determining a cell color value comprise setting the cell color value to the ratio of the total color value to a maximum color value.

* * * * *